(12) United States Patent
Kim et al.

(10) Patent No.: US 10,000,635 B2
(45) Date of Patent: Jun. 19, 2018

(54) THERMOPLASTIC RESIN COMPOSITION FOR AUTOMOTIVE INTERIOR COMPONENTS AND MOLDED ARTICLE FOR AUTOMOTIVE INTERIOR COMPONENTS USING THE SAME

(71) Applicant: Lotte Advanced Materials Co., Ltd., Yeosu-si (KR)

(72) Inventors: In Chol Kim, Uiwang-si (KR); Kee Hae Kwon, Uiwang-si (KR); Jung Woo Park, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 59 days.

(21) Appl. No.: 14/982,165

(22) Filed: Dec. 29, 2015

(65) Prior Publication Data

US 2016/0185959 A1 Jun. 30, 2016

(30) Foreign Application Priority Data

Dec. 31, 2014 (KR) ................ 10-2014-0196097
Dec. 9, 2015 (KR) ................ 10-2015-0175447

(51) Int. Cl.
*C08L 69/00* (2006.01)

(52) U.S. Cl.
CPC .................... *C08L 69/00* (2013.01)

(58) Field of Classification Search
CPC ........... C08L 51/04; C08L 69/00; C08L 25/12
See application file for complete search history.

(56) References Cited

U.S. PATENT DOCUMENTS

| | | | | |
|---|---|---|---|---|
| 6,133,360 A * | 10/2000 | Barren | ............ | C08L 69/00 523/200 |
| 9,346,942 B2 | 5/2016 | Chung et al. | | |
| 9,469,759 B2 | 10/2016 | Chung et al. | | |
| 2012/0172502 A1* | 7/2012 | Lee | ............ | C08L 55/02 524/114 |
| 2014/0187717 A1* | 7/2014 | Kwon | ............ | C08L 69/00 525/67 |
| 2016/0185959 A1 | 6/2016 | Kim et al. | | |
| 2016/0304711 A1 | 10/2016 | Cho et al. | | |
| 2016/0319128 A1 | 11/2016 | Park et al. | | |
| 2016/0326358 A1 | 11/2016 | Lee et al. | | |
| 2017/0002198 A1 | 1/2017 | Jeong et al. | | |

FOREIGN PATENT DOCUMENTS

| | | |
|---|---|---|
| KR | 10-0680338 B1 | 2/2007 |
| KR | 0725940 B1 | 5/2007 |
| KR | 2009-0038507 A | 4/2009 |
| KR | 10-2014-0005510 A | 1/2014 |

OTHER PUBLICATIONS

Office Action in commonly owned U.S. Appl. No. 15/099,770, dated Jan. 26, 2017, pp. 1-13.
Office Action in counterpart German Application No. 102015122922.6 dated Dec. 5, 2017, pp. 1-5.
Office Action in counterpart Korean Application No. 10-2015-0175447 dated Jul. 11, 2017, pp. 1-6.

* cited by examiner

*Primary Examiner* — Mark S Kaucher
(74) *Attorney, Agent, or Firm* — Additon, Higgins & Pendleton, P.A.

(57) ABSTRACT

A thermoplastic resin composition for automotive interior components and a molded article using the same. The thermoplastic resin composition includes: a base resin comprising about 55 wt % to about 90 wt % of a polycarbonate resin and about 10 wt % to about 45 wt % of a vinyl cyanide compound-aromatic vinyl compound copolymer; about 5 parts by weight to about 30 parts by weight of an impact modifier; and about 1 part by weight to about 8 parts by weight of a matting agent, each based on about 100 parts by weight of the base resin. The impact modifier includes a first impact modifier which is a core-shell type acrylic rubber-modified graft copolymer, and a second impact modifier which is a core-shell type diene-acrylic rubber-modified graft copolymer.

13 Claims, No Drawings

THERMOPLASTIC RESIN COMPOSITION FOR AUTOMOTIVE INTERIOR COMPONENTS AND MOLDED ARTICLE FOR AUTOMOTIVE INTERIOR COMPONENTS USING THE SAME

CROSS-REFERENCE TO RELATED APPLICATION

This application claims priority under 35 USC Section 119 to and the benefit of Korean Patent Application No. 10-2014-0196097, filed on Dec. 31, 2014, and Korean Patent Application No. 10-2015-0175447, filed on Dec. 9, 2015, in the Korean Intellectual Property Office, the entire disclosures of each of which are incorporated herein by reference.

FIELD OF THE INVENTION

The present invention relates to a thermoplastic resin composition for automotive interior components and a molded article using the same.

BACKGROUND

Among automotive interior components, an overhead console is partially exposed to UV rays and thus requires UV stability, high impact resistance and heat resistance for driver safety.

For such reasons, most automobile parts makers use a product obtained by post-processing, for example, painting, a molded article fabricated using an alloy resin of polycarbonate and acrylonitrile-butadiene-styrene (ABS) copolymer, i.e. a PC/ABS resin in automotive interior parts. However, there has been a continuous need for unpainted materials due to high manufacturing costs and environmental problems.

An alloy resin of polycarbonate and acrylonitrile-styrene-acrylate (ASA), i.e. a PC/ASA resin, is an engineering plastic which is widely used in automotive exterior parts, for example, a radiator grill and an outside mirror housing due to its excellent weather resistance and heat resistance. However, due to a relatively low glass transition temperature (Tg) of acrylate-based rubbers, the PC/ASA resin exhibits limited impact resistance as compared with a PC/ABS resin. In addition, when a matting agent is added to the PC/ASA resin in order to provide low gloss properties to some automotive interior parts requiring low gloss properties, such as an overhead console, impact resistance of the PC/ASA resin may be further deteriorated.

Although various techniques relating to an ASA resin have been proposed in various patent documents including Korean Patent Publication No. 2009-0038507A, a technology of reinforcing impact resistance of an ASA resin has not been yet disclosed.

Therefore, there is a need for a thermoplastic resin composition for automotive interior components which may exhibit excellent impact resistance with minimal or no occurrence of gas silver streaks while providing low gloss properties.

SUMMARY OF THE INVENTION

Embodiments provide a thermoplastic resin composition for automotive interior components including: a base resin comprising about 55 wt % to about 90 wt % of a polycarbonate resin and about 10 wt % to about 45 wt % of a vinyl cyanide compound-aromatic vinyl compound copolymer; about 5 parts by weight to about 30 parts by weight of an impact modifier; and about 1 part by weight to about 8 parts by weight of a matting agent, each based on about 100 parts by weight of the base resin, wherein the impact modifier comprises a first impact modifier which is a core-shell type acrylic rubber-modified graft copolymer, and a second impact modifier which is a core-shell type diene-acrylic rubber-modified graft copolymer.

The thermoplastic resin composition may further include an alkyl (meth)acrylate compound-aromatic vinyl compound-vinyl cyanide compound copolymer.

The matting agent may include an aromatic vinyl compound-vinyl cyanide compound copolymer having a weight average molecular weight of about 1,000,000 g/mol to about 10,000,000 g/mol, and the aromatic vinyl compound-vinyl cyanide compound copolymer may be a copolymer of a monomer mixture comprising about 65 wt % to about 85 wt % of an aromatic vinyl compound and about 15 wt % to about 35 wt % of a vinyl cyanide compound.

The first impact modifier may include: an acrylic rubber polymer core including a polymer of an alkyl (meth)acrylate compound and an alkyl (meth)acrylate compound-aromatic vinyl compound copolymer; and a shell layer formed by grafting an aromatic vinyl compound-vinyl cyanide compound copolymer to the acrylic rubber polymer core.

The first impact modifier may include about 55 wt % to about 65 wt % of the acrylic rubber polymer core and about 35 wt % to about 45 wt % of the shell layer, and, in the shell layer, an amount ratio of the aromatic vinyl compound to the vinyl cyanide compound may range from about 4:1 to about 1.5:1.

The second impact modifier may include: a diene-acrylic rubber polymer core comprising a diene rubber polymer and a polymer of alkyl (meth)acrylate; and a shell layer formed by grafting a polymer of alkyl (meth)acrylate to the diene-acrylic rubber polymer core.

The second impact modifier may include about 55 wt % to about 65 wt % of the diene-acrylic rubber polymer core and about 35 wt % to about 45 wt % of the shell layer.

A weight ratio of the first impact modifier to the second impact modifier may range from about 3:1 to about 1:1.

The alkyl (meth)acrylate compound-aromatic vinyl compound-vinyl cyanide compound copolymer may be present in an amount of about 10 parts by weight to about 20 parts by weight based on about 100 parts by weight of the base resin.

The alkyl (meth)acrylate compound-aromatic vinyl compound-vinyl cyanide compound copolymer may be a copolymer of a monomer mixture including about 2 wt % to about 10 wt % of a vinyl cyanide compound, about 15 wt % to about 25 wt % of an aromatic vinyl compound, and about 65 wt % to about 80 wt % of an alkyl (meth)acrylate compound.

Also provided is a molded article for automotive interior components formed using the thermoplastic resin composition for automotive interior components as set forth above.

The molded article may have an Izod impact resistance (⅛", notched) of about 55 kgf·cm/cm to about 80 kgf·cm/cm, as measured at room temperature in accordance with ASTM D256 and may have a gloss of about 15% to about 50%, as measured at 60° in accordance with ASTM D523.

The molded article may have a color difference ($\Delta E$) of about 2.0 to about 2.9, as measured under weather exposure conditions of 2,500 $kJ/m^2$ in accordance with SAE J1960.

Low gloss properties may be realized by adding a matting agent to a base resin including a polycarbonate resin and a vinyl cyanide compound-aromatic vinyl compound copolymer.

Deterioration in impact resistance may be minimized or prevented due to a matting agent with minimal or no occurrence of gas silver streaks by adding different core-shell type impact modifiers in an optimal ratio.

The thermoplastic resin composition for automotive interior components may exhibit enhanced coloring properties, heat resistance, and light stability by including components mixed in an optimal ratio and may eliminate a need for painting and is thus eco-friendly.

Also the thermoplastic resin composition for automotive interior components may enhance low gloss properties required for automotive interior components by including a polycarbonate resin and a vinyl cyanide compound-aromatic vinyl compound copolymer as a base resin and a matting agent added thereto while minimizing or preventing deterioration in impact resistance due to the matting agent with minimal or no occurrence of gas silver streaks by further including different core-shell type impact modifiers in an optimal ratio.

In addition, the thermoplastic resin composition for automotive interior components may exhibit enhanced coloring properties, heat resistance, and light stability by including components mixed in an optimal ratio and may eliminate a need for painting and is thus eco-friendly.

DETAILED DESCRIPTION

Hereinafter, a thermoplastic resin composition for automotive interior components and a molded article using the same according to embodiments of the present invention will be better understood through the following detailed description, in which some, but not all, embodiments are described. Indeed, this invention may be embodied in many different forms and should not be construed as limited to the embodiments set forth herein; rather, these embodiments are provided so that this disclosure will satisfy applicable legal requirements. It should be understood that these embodiments are provided for illustration only and are not to be construed in any way as limiting the scope of the present invention defined by the appended claims.

Unless otherwise defined herein, the term "copolymerization" may refer to block copolymerization, random copolymerization, graft copolymerization, or alternating copolymerization, and the term "copolymer" may refer to a block copolymer, a random copolymer, a graft copolymer, or an alternating copolymer.

In addition, as used herein, the term "(meth)acrylate" refers to "acrylate" and "methacrylate", and a compound having "(meth)" in its name, such as "(meth)acrylic acid", commonly refers to both a compound having "meth" in its name and a compound not having "meth" in its name.

Thermoplastic Resin Composition for Automotive Interior Components

Embodiments provide a thermoplastic resin composition for automotive interior components. The thermoplastic resin composition can be optimized for automotive interior components such as an overhead console, a console box, and/or a center fascia.

In exemplary embodiments, the thermoplastic resin composition for automotive interior components includes: a base resin including about 55 wt % to about 90 wt % of a polycarbonate resin and about 10 wt % to about 45 wt % of a vinyl cyanide compound-aromatic vinyl compound copolymer; about 5 parts by weight to about 30 parts by weight of an impact modifier; and about 1 part by weight to about 8 parts by weight of a matting agent each based on about 100 parts by weight of the base resin.

Base Resin

The base resin includes about 55 wt % to about 90 wt % of the polycarbonate resin and about 10 wt % to about 45 wt % of the vinyl cyanide compound-aromatic vinyl compound copolymer based on the total weight (100 wt %) of the base resin.

Polycarbonate Resin

The polycarbonate resin may include any typical polycarbonate resin. For example, the polycarbonate resin may be an aromatic polycarbonate resin prepared by reacting phosgene, a halogen formate, or a carbonate diester with one or more diphenols represented by Formula 1:

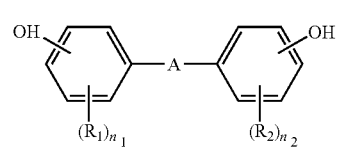

[Formula 1]

where A is a single bond, a substituted or unsubstituted $C_1$ to $C_{30}$ linear or branched alkylene group, a substituted or unsubstituted substituted or unsubstituted $C_2$ to $C_5$ alkenylene group, a substituted or unsubstituted $C_2$ to $C_5$ alkylidene group, a substituted or unsubstituted $C_1$ to $C_{30}$ linear or branched haloalkylene group, a substituted or unsubstituted $C_5$ to $C_6$ cycloalkylene group, a substituted or unsubstituted $C_5$ to $C_6$ cycloalkenylene group, a substituted or unsubstituted $C_5$ to $C_{10}$ cycloalkylidene group, a substituted or unsubstituted $C_6$ to $C_{30}$ arylene group, a substituted or unsubstituted $C_1$ to $C_{20}$ linear or branched alkoxylene group, a halogenated ester group, a carbonate ester group, CO, S, or $SO_2$; $R_1$ and $R_2$ are the same or different and are each independently a substituted or unsubstituted $C_1$ to $C_{30}$ alkyl group or a substituted or unsubstituted $C_6$ to $C_{30}$ aryl group; and $n_1$ and $n_2$ are the same or different and are each independently an integer from 0 to 4.

As used herein, the term "substituted" means that a hydrogen atom is substituted with a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, or a combination thereof. Also as used herein, unless otherwise defined, the term "hetero" refers to one or more of an oxygen atom (O), a nitrogen atom (N), a sulfur atom (S), a phosphorous atom (P), and the like and combinations thereof.

A diphenol represented by Formula 1 may be used alone, or at least two of the diphenols represented by Formula 1 may be combined to form a repeat unit of the polycarbonate resin.

Examples of the diphenols may include without limitation hydroquinone, resorcinol, 4,4'-dihydroxyphenyl, 2,2-bis-(4-hydroxyphenyl)-propane (also referred to as "bisphenol A"), 2,4-bis-(4-hydroxyphenyl)-2-methylbutane, bis(4-hydroxyphenyl)-methane, 1,1-bis-(4-hydroxyphenyl)-cyclohexane, 2,2-bis-(3-chloro-4-hydroxyphenyl)-propane, 2,2-bis-(3,5-dimethyl-4-hydroxyphenyl)-propane, 2,2-bis(3-methyl-4-hydroxyphenyl)-propane, 2,2-bis(3,5-dichloro-4-hydroxyphenyl)-propane, 2,2-bis(3,5-dibromo-4-hydroxyphenyl)-propane, bis(4-hydroxyphenyl)sulfoxide, bis(4- hydroxyphenyl)-ketone, bis(4-hydroxyphenyl)-ether, and the like, and combinations thereof.

In exemplary embodiments, the diphenol may include 2,2-bis(4-hydroxyphenyl)-propane, 2,2-bis(3,5-dimethyl-4-hydroxyphenyl)-propane, 2,2-bis(3-methyl-4-hydroxyphenyl)-propane, 2,2-bis(3,5-dichloro-4-hydroxyphenyl)-propane, and/or 1,1-bis(4-hydroxyphenyl)cyclohexane. For example, the diphenol may include 2,2-bis(4-hydroxyphenyl)-propane.

The polycarbonate resin may have a weight average molecular weight of about 5,000 g/mol to about 200,000 g/mol. For example, the polycarbonate resin may have a weight average molecular weight of about 10,000 g/mol to about 30,000 g/mol. By way of another example, the polycarbonate resin may have a weight average molecular weight of about 15,000 g/mol to about 25,000 g/mol.

Considering effects upon mixing with the impact modifier and the matting agent, the polycarbonate resin may have a weight average molecular weight in the above range to provide excellent impact resistance as well as proper flowability and thus good processability to the resin composition. Alternatively, a mixture of at least two polycarbonate resins having different weight average molecular weights may be used in order to improve flowability of the resin composition.

The polycarbonate resin may also be a copolymer or a mixture of copolymers prepared using at least two diphenols. In addition, the polycarbonate resin may include one or more of a linear polycarbonate resin, a branched polycarbonate resin, a polyester-carbonate copolymer resin, and the like.

Examples of the linear polycarbonate resin may include a bisphenol-A polycarbonate resin, and the like. Examples of the branched polycarbonate resin may include a compound prepared by reacting a polyfunctional aromatic compound such as trimellitic anhydride and trimellitate with one or more diphenols and carbonate. Here, the polyfunctional aromatic compound may be present in an amount of about 0.05 mol % to about 2 mol % based on the total amount of the branched polycarbonate resin. Examples of the polyester-carbonate copolymer resin may include a compound prepared by reacting a bifunctional carboxylate with one or more diphenols and carbonate. Here, the carbonate may include diaryl carbonates such as diphenyl carbonate and ethylene carbonates, and the like.

Vinyl Cyanide Compound-Aromatic Vinyl Compound Copolymer

The vinyl cyanide compound-aromatic vinyl compound copolymer may include a copolymer of a mixture of an aromatic vinyl monomer and a monomer copolymerizable with the aromatic vinyl monomer. For example, the vinyl cyanide compound-aromatic vinyl compound copolymer may be prepared by copolymerization of an aromatic vinyl monomer and a vinyl cyanide monomer.

In exemplary embodiments, the vinyl cyanide compound-aromatic vinyl compound copolymer may be prepared by copolymerization of a monomer mixture including about 55 wt % to about 80 wt % of the aromatic vinyl compound and about 20 wt % to about 45 wt % of the vinyl cyanide compound based on the total weight (100 wt %) of the monomer mixture.

In some embodiments, the vinyl cyanide compound-aromatic vinyl compound copolymer may include the aromatic vinyl compound in an amount of about 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the aromatic vinyl compound may be present in an amount of from about any of the foregoing amounts to about any other of the foregoing amounts.

In some embodiments, the vinyl cyanide compound-aromatic vinyl compound copolymer may include the vinyl cyanide compound in an amount of about 20, 21, 22, 23, 24, 25, 26, 27, 28, 29, 30, 31, 32, 33, 34, 35, 36, 37, 38, 39, 40, 41, 42, 43, 44, or 45 wt %. Further, according to some embodiments of the present invention, the vinyl cyanide compound may be present in an amount of from about any of the foregoing amounts to about any other of the foregoing amounts.

Examples of the vinyl cyanide compound for formation of the copolymer may include without limitation acrylonitrile, methacrylonitrile, fumaronitrile, and the like. These may be used alone or as a mixture thereof. Examples of the aromatic vinyl compound may include without limitation styrene, α-methylstyrene, p-t-butyl styrene, 2,4-dimethyl styrene, bromostyrene, chlorostyrene, vinyl toluene, and mixtures thereof. However, the vinyl cyanide compound and aromatic vinyl compound available for formation of the copolymer are not limited to the materials as set forth above and may include any typical vinyl cyanide compounds and aromatic vinyl compounds.

The vinyl cyanide compound-aromatic vinyl compound copolymer may have a weight average molecular weight of about 50,000 g/mol to about 300,000 g/mol. For example, the vinyl cyanide compound-aromatic vinyl compound copolymer may have a weight average molecular weight of about 80,000 g/mol to about 150,000 g/mol.

In exemplary embodiments, the base resin may include about 55 wt % to about 90 wt % of the polycarbonate resin and about 10 wt % to about 45 wt % of the vinyl cyanide compound-aromatic vinyl compound copolymer, based on the total weight (100 wt %) of the base resin. For example, the base resin may include about 68 wt % to about 88 wt % of the polycarbonate resin and about 12 wt % to about 32 wt % of the vinyl cyanide compound-aromatic vinyl compound copolymer.

In some embodiments, the base resin may include the polycarbonate resin in an amount of about 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on the total weight (100 wt %) of the base resin. Further, according to some embodiments of the present invention, the polycarbonate resin may be present in an amount of from about any of the foregoing amounts to about any other of the foregoing amounts.

In some embodiments, the base resin may include the vinyl cyanide compound-aromatic vinyl compound copolymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 wt % based on the total weight (100 wt %) of the base resin. Further, according to some embodiments of the present invention, the vinyl cyanide compound-aromatic vinyl compound copolymer may be present in an amount of from about any of the foregoing amounts to about any other of the foregoing amounts.

When the amounts of the polycarbonate resin and the vinyl cyanide compound-aromatic vinyl compound copolymer are outside of the above ranges, it can be impossible to realize excellent impact resistance due to deterioration in impact resistance caused by the matting agent.

Impact Modifier

The impact modifier includes a first impact modifier which is a core-shell type acrylic rubber-modified graft copolymer and a second impact modifier which is a core-shell type diene-acrylic rubber-modified graft copolymer.

First Impact Modifier

In exemplary embodiments, the first impact modifier can include: an acrylic rubber polymer core including a polymer of an alkyl (meth)acrylate compound and an alkyl (meth) acrylate compound-aromatic vinyl compound copolymer; and a shell layer formed by grafting an aromatic vinyl compound-vinyl cyanide compound copolymer to the acrylic rubber polymer core. As a result, the first impact modifier may exhibit improved compatibility with the aromatic vinyl compound-vinyl cyanide compound copolymer, which constitutes the base resin, which can thereby considerably enhance impact resistance.

The polymer of the alkyl (meth)acrylate compound may be prepared by homo-polymerization or copolymerization of the alkyl (meth)acrylate monomer.

In the alkyl (meth)acrylate compound, "alkyl" refers to a $C_1$ to $C_{10}$ alkyl group. Examples of the alkyl (meth)acrylate compound may include without limitation methyl (meth) acrylate, ethyl (meth)acrylate, propyl (meth)acrylate, isopropyl (meth)acrylate, butyl (meth)acrylate, t-butyl (meth) acrylate, 2-ethylhexyl hexyl (meth)acrylate, and the like, and combinations thereof.

Examples of the aromatic vinyl compound can include without limitation styrene, α-methylstyrene, p-t-butyl styrene, 2,4-dimethyl styrene, bromostyrene, chlorostyrene, vinyl toluene, and the like, and combinations thereof.

Examples of the vinyl cyanide compound can include acrylonitrile, methacrylonitrile, fumaronitrile, and the like, and combinations thereof.

The first impact modifier may include about 55 wt % to about 65 wt % of the acrylic rubber polymer core and about 35 wt % to about 45 wt % of the shell layer, based on the total weight (100 wt %) of the first impact modifier. For example, the first impact modifier may include about 58 wt % to about 62 wt % of the acrylic rubber polymer core and about 38 wt % to about 42 wt % of the shell layer.

In some embodiments, the first impact modifier may include the acrylic rubber polymer core in an amount of about 55, 56, 57, 58, 59, 60, 61, 62, 63, 64, or 65 wt %. Further, according to some embodiments of the present invention, the acrylic rubber polymer core may be present in an amount of from about any of the foregoing amounts to about any other of the foregoing amounts.

In some embodiments, the first impact modifier may include the shell layer in an amount of about 35, 36, 37, 38, 39, 40, 41, 42, 43, 44, or 45 wt %. Further, according to some embodiments of the present invention, the shell layer may be present in an amount of from about any of the foregoing amounts to about any other of the foregoing amounts.

Within this range, the resin composition may exhibit excellent impact resistance and the first impact modifier may exhibit excellent dispersibility in the matrix of the resin composition.

In exemplary embodiments, in the shell layer, an amount ratio of the aromatic vinyl compound to the vinyl cyanide compound may range from about 4:1 to about 1.5:1. For example, the amount ratio may range from about 3:1 to about 2:1. Within this range, the resin composition may exhibit excellent impact resistance and the first impact modifier may exhibit excellent dispersibility in the matrix of the resin composition.

In addition, the first impact modifier may include the acrylic rubber polymer core having a weight average molecular weight of about 200,000 g/mol to about 10,000, 000 g/mol; and the shell layer having a weight average molecular weight of about 50,000 g/mol to about 500,000 g/mol.

The acrylic rubber polymer core may have an average particle diameter (D50) of about 210 nm to about 400 nm. For example, the acrylic rubber polymer core may have an average particle diameter (D50) of about 210 nm to about 350 nm. Within this range, the resin composition may exhibit excellent impact resistance and coloring properties.

Here, although the average particle diameter of the acrylic rubber polymer core may be expressed by the average size of a group of quantified measurements, the mode field diameter representing the maximum value of a distribution, the median diameter corresponding to a median value on an integral distribution curve, and various average diameters (number-averaged diameter, length-averaged diameter, area-averaged diameter, mass-average diameter, volume-average diameter, and the like) are generally used. Unless otherwise stated herein, the "average particle diameter" is the "number-average diameter" and refers to D50 (a diameter at a point at which a distribution rate reaches 50%).

In exemplary embodiments, the first impact modifier may have a refractive index of about 1.51 to about 1.54. Within this range, the first impact modifier may impart excellent coloring properties to the thermoplastic resin composition.

Second Impact Modifier

The second impact modifier is a core-shell type diene-acrylic rubber-modified graft copolymer and may include a diene-acrylic rubber polymer core including a diene rubber polymer and a polymer of alkyl (meth)acrylate; and a shell layer formed by grafting a polymer of alkyl (meth)acrylate to the diene-acrylic rubber polymer core. The second impact modifier serves to enhance impact resistance at an interface between the polycarbonate resin and the vinyl cyanide compound-aromatic vinyl compound copolymer.

In exemplary embodiments, the core of the second impact modifier may include a mixture of a diene rubber polymer obtained by polymerization of a diene monomer and an acrylic rubber polymer obtained by polymerization of an alkyl (meth)acrylate monomer, or may include a rubber polymer obtained by polymerization of a mixture of the diene monomer and the alkyl (meth)acrylate monomer.

Examples of the diene monomer may include without limitation butadiene, isoprene, and the like, and combinations thereof. For example, the diene monomer may include butadiene.

Examples of the alkyl (meth)acrylate monomer may include alkyl (meth)acrylates such as but not limited to methyl acrylate, ethyl acrylate, n-propyl acrylate, n-butyl acrylate, 2-ethylhexyl acrylate, hexyl methacrylate, 2-ethylhexyl methacrylate, and the like, and combinations thereof. Here, "alkyl" refers to a $C_1$ to $C_{10}$ alkyl group.

In exemplary embodiments, the diene rubber polymer obtained by polymerization of a diene monomer may include polybutadiene and the like.

The second impact modifier may include about 55 wt % to about 65 wt % of the diene-acrylic rubber polymer core and about 35 wt % to about 45 wt % of the shell layer, based on the total weight (100 wt %) of the second impact modifier. For example, the second impact modifier may include about 58 wt % to about 62 wt % of the diene-acrylic rubber polymer core and about 38 wt % to about 42 wt % of the shell layer.

In some embodiments, the second impact modifier may include the diene-acrylic rubber polymer core in an amount of about 55, 56, 57, 58, 59, 60, 61, 62, 63, 64, or 65 wt %. Further, according to some embodiments of the present invention, the diene-acrylic rubber polymer core may be present in an amount of from about any of the foregoing amounts to about any other of the foregoing amounts.

In some embodiments, the second impact modifier may include the shell layer in an amount of about 35, 36, 37, 38, 39, 40, 41, 42, 43, 44, or 45 wt %. Further, according to some embodiments of the present invention, the shell layer may be present in an amount of from about any of the foregoing amounts to about any other of the foregoing amounts.

Within this range, it is possible to enhance appearance characteristics, impact resistance, and coloring properties of a final molded article.

The diene-acrylic rubber polymer core may have an average particle diameter (D50) of about 100 nm to about 200 nm. For example, the diene-acrylic rubber polymer core may have an average particle diameter (D50) of about 150 nm to about 200 nm. Within this range, the second impact modifier may maximize impact resistance reinforcing effects while enhancing coloring properties and gloss.

In addition, a weight ratio of the first impact modifier to the second impact modifier may range from about 3:1 to about 1:1. For example, the weight ratio may range from about 2.5:1 to about 1.5:1. Within this range, it is possible to maximize synergistic effects of the first impact modifier and the second impact modifier contributing to enhancement in impact resistance in a continuous phase of the aromatic vinyl compound-vinyl cyanide compound copolymer and at an interface between the polycarbonate resin and the aromatic vinyl compound-vinyl cyanide compound copolymer, respectively.

The thermoplastic resin composition for automotive interior components can include a total amount of the first impact modifier and the second impact modifier of about 5 parts by weight to about 30 parts by weight based on about 100 parts by weight of the base resin including the polycarbonate resin and the aromatic vinyl compound-vinyl cyanide compound copolymer. For example, in total, the first impact modifier and the second impact modifier may be present in an amount of about 15 parts by weight to about 25 parts by weight based on about 100 parts by weight of the base resin.

In some embodiments, the first impact modifier and the second impact modifier can be present in total in an amount of about 5, 6, 7, 8, 9, 10, 11, 12, 13, 14, 15, 16, 17, 18, 19, 20, 21, 22, 23, 24, 25, 26, 27, 28, 29, or 30 parts by weight based on about 100 parts by weight of the base resin. Further, according to some embodiments of the present invention, the first impact modifier and the second impact modifier may be present in a total amount of from about any of the foregoing amounts to about any other of the foregoing amounts.

If the impact modifiers are present in an amount of less than about 5 parts by weight, enhancement in impact resistance can be insignificant, whereas if the impact modifiers are present in an amount of more than about 30 parts by weight, this may cause deterioration in other physical properties such as heat resistance and stiffness.

In exemplary embodiments, the second impact modifier may have a refractive index of about 1.52 to about 1.55. Within this range, it is possible to provide excellent coloring properties to the thermoplastic resin composition.

Matting Agent

The matting agent may include an ultra-high molecular weight aromatic vinyl compound-vinyl cyanide compound copolymer having a weight average molecular weight of about 1,000,000 g/mol to about 10,000,000 g/mol. The aromatic vinyl compound-vinyl cyanide compound copolymer may be a copolymer of a monomer mixture including about 65 wt % to about 85 wt % of an aromatic vinyl compound and about 15 wt % to about 35 wt % of a vinyl cyanide compound based on the total weight of the monomer mixture. In this case, the matting agent may effectively provide low gloss properties to the resin composition.

In some embodiments, the aromatic vinyl compound-vinyl cyanide compound copolymer may include the aromatic vinyl compound in an amount of about 65, 66, 67, 68, 69, 70, 71, 72, 73, 74, 75, 76, 77, 78, 79, 80, 81, 82, 83, 84, or 85 wt %. Further, according to some embodiments of the present invention, the aromatic vinyl compound may be present in an amount of from about any of the foregoing amounts to about any other of the foregoing amounts.

In some embodiments, the aromatic vinyl compound-vinyl cyanide compound copolymer may include the vinyl cyanide compound in an amount of about 15, 16, 17, 18, 19, 20, 21, 22, 23, 24, 25, 26, 27, 28, 29, 30, 31, 32, 33, 34, or 35 wt %. Further, according to some embodiments of the present invention, the vinyl cyanide compound may be present in an amount of from about any of the foregoing amounts to about any other of the foregoing amounts.

The thermoplastic resin composition for automotive interior components can include the matting agent in an amount of about 1 part by weight to about 8 parts by weight based on about 100 parts by weight of the base resin including the polycarbonate resin and the aromatic vinyl compound-vinyl cyanide compound copolymer. For example, the matting agent may be present in an amount of about 3 parts by weight to about 6 parts by weight. In some embodiments, the matting agent may be present in an amount of about 1, 2, 3, 4, 5, 6, 7, or 8 parts by weight. Further, according to some embodiments of the present invention, the matting agent may be present in an amount of from about any of the foregoing amounts to about any other of the foregoing amounts.

If the matting agent is present in an amount of less than about 1 part by weight, matting effects can be insignificant, whereas if the matting agent is present in an amount of more than about 8 parts by weight, this may cause deterioration in general properties such as impact resistance and flowability.

Alkyl (Meth)Acrylate Compound-Aromatic Vinyl Monomer-Vinyl Cyanide Monomer Copolymer The thermoplastic resin composition for automotive interior components may further include an alkyl (meth)acrylate compound-aromatic vinyl compound-vinyl cyanide compound copolymer, which can serve to enhance coloring properties of the thermoplastic resin composition.

In the alkyl (meth)acrylate compound, "alkyl" refers to a $C_1$ to $C_{10}$ alkyl group. Examples of the alkyl (meth)acrylate compound may include without limitation at least one selected from among methyl (meth)acrylate, ethyl (meth)acrylate, propyl (meth)acrylate, isopropyl (meth)acrylate, butyl (meth)acrylate, t-butyl (meth)acrylate, 2-ethylhexyl (meth)acrylate, and the like, and combinations thereof.

Examples of the aromatic vinyl compound may include without limitation at least one selected from among styrene, α-methyl styrene, p-t-butyl styrene, 2,4-dimethyl styrene, bromostyrene, chlorostyrene, vinyl toluene, and the like, and combinations thereof.

Examples of the vinyl cyanide compound may include without limitation at least one selected from among acrylonitrile, methacrylonitrile, fumaronitrile, and the like, and combinations thereof.

The alkyl (meth)acrylate compound-aromatic vinyl compound-vinyl cyanide compound copolymer may have a weight average molecular weight of about 50,000 g/mol to about 200,000 g/mol. For example, the alkyl (meth)acrylate compound-aromatic vinyl compound-vinyl cyanide compound copolymer may have a weight average molecular weight of about 80,000 g/mol to about 120,000 g/mol.

In exemplary embodiments, the alkyl (meth)acrylate compound-aromatic vinyl compound-vinyl cyanide compound copolymer may have a refractive index of about 1.51 to about 1.54. Within this range, it is possible to provide excellent coloring properties to the thermoplastic resin composition.

A difference between the refractive index of the alkyl (meth)acrylate compound-aromatic vinyl compound-vinyl cyanide compound copolymer and the refractive index of the impact modifier (average refractive index of the first impact modifier and the second impact modifier) may range from about 0.001 to about 0.02. Within this range, the thermoplastic resin composition may realize further enhanced coloring properties.

The thermoplastic resin composition for automotive interior components can include the alkyl (meth)acrylate compound-aromatic vinyl compound-vinyl cyanide compound copolymer in an amount of about 10 parts by weight to about 20 parts by weight based on about 100 parts by weight of the base resin. For example, the alkyl (meth)acrylate compound-aromatic vinyl compound-vinyl cyanide compound copolymer may be present in an amount of about 12 parts by weight to about 15 parts by weight based on about 100 parts by weight of the base resin.

In some embodiments, the alkyl (meth)acrylate compound-aromatic vinyl compound-vinyl cyanide compound copolymer may be present in an amount of about 10, 11, 12, 13, 14, 15, 16, 17, 18, 19, or 20 parts by weight. Further, according to some embodiments of the present invention, the alkyl (meth)acrylate compound-aromatic vinyl compound-vinyl cyanide compound copolymer may be present in an amount of from about any of the foregoing amounts to about any other of the foregoing amounts.

Within this range, the resin composition may realize excellent coloring properties while maintaining excellent impact resistance.

The alkyl (meth)acrylate compound-aromatic vinyl compound-vinyl cyanide compound copolymer may be a copolymer of a monomer mixture including about 2 wt % to about 10 wt % of a vinyl cyanide compound, about 15 wt % to about 25 wt % of an aromatic vinyl compound, and about 65 wt % to about 80 wt % of an alkyl (meth)acrylate compound, each based on the total weight (100 wt %) of the vinyl cyanide compound, the aromatic vinyl compound, and the alkyl (meth)acrylate compound.

In some embodiments, the alkyl (meth)acrylate compound-aromatic vinyl compound-vinyl cyanide compound copolymer may include the vinyl cyanide compound in an amount of about 2, 3, 4, 5, 6, 7, 8, 9, or 10 wt %. Further, according to some embodiments of the present invention, the vinyl cyanide compound may be present in an amount of from about any of the foregoing amounts to about any other of the foregoing amounts.

In some embodiments, the alkyl (meth)acrylate compound-aromatic vinyl compound-vinyl cyanide compound copolymer may include the aromatic vinyl compound in an amount of about 15, 16, 17, 18, 19, 20, 21, 22, 23, 24, or 25 wt %. Further, according to some embodiments of the present invention, the aromatic vinyl compound may be present in an amount of from about any of the foregoing amounts to about any other of the foregoing amounts.

In some embodiments, the alkyl (meth)acrylate compound-aromatic vinyl compound-vinyl cyanide compound copolymer may include the alkyl (meth)acrylate compound in an amount of about 65, 66, 67, 68, 69, 70, 71, 72, 73, 74, 75, 76, 77, 78, 79, or 80 wt %. Further, according to some embodiments of the present invention, the alkyl (meth)acrylate compound may be present in an amount of from about any of the foregoing amounts to about any other of the foregoing amounts.

Within these ranges, the thermoplastic resin composition may realize further enhanced coloring properties.

In addition to the aforementioned components, the thermoplastic resin composition for automotive interior components according to the present invention may further include one or more additives to improve injection moldability of the thermoplastic resin composition and/or to provide good balance between physical properties depending upon the end use of the thermoplastic resin composition. Examples of the additives may include without limitation flame retardants, surfactants, nucleating agents, coupling agents, fillers, plasticizers, lubricants, antimicrobial agents, release agents, heat stabilizers, antioxidants, light stabilizers, inorganic additives, stabilizers, antistatic agents, pigments, dyes, flame proofing agents, and the like. These may be used alone or as a mixture thereof.

These additives may be present in an appropriate amount without affecting properties of the thermoplastic resin composition. For example, the additives may be present in an amount of about 20 parts by weight or less based on about 100 parts by weight of the base resin including the polycarbonate resin and the aromatic vinyl compound-vinyl cyanide copolymer, without being limited thereto.

Molded Article for Automotive Interior Components

A molded article for automotive interior components formed using the thermoplastic resin composition for automotive interior components as set forth above is also provided. The molded article for automotive interior components includes an aromatic vinyl compound-vinyl cyanide compound copolymer having a weight average molecular weight of about 1,000,000 g/mol to about 10,000,000 g/mol, as a matting agent, and may have an Izod impact resistance (⅛", notched) of about 55 kgf·cm/cm to about 80 kgf·cm/cm, as measured in accordance with ASTM D256. The molded article for automotive interior components may have a gloss of about 15% to about 50%, as measured at 60° in accordance with ASTM D523. The molded article for automotive interior components may have a color difference (ΔE) of about 2.0 to about 2.9 between before/after evaluation, as measured under weather exposure conditions of 2,500 kJ/m² in accordance with SAE J1960. Through several experiments, it could be confirmed that the above ranges had a critical significance in providing a thermoplastic resin capable of realizing excellent impact resistance and weather resistance when used for automotive interior components.

ΔE is an index of color difference in a Commission Internationale de l'Eclairage (CIE) Lab color system. ΔE is calculated according to Equation 1:

$$\Delta E = \sqrt{(\Delta L)^2 + (\Delta a)^2 + (\Delta b)^2} \quad \text{[Equation 1]}$$

In the CIE Lab color system, brightness is designated by L, and chromaticities indicative of color and chroma are designated by a and b, respectively. A higher a value indicates a color closer to red, whereas a lower a value indicates a color closer to green. A higher b value indicates a color closer to yellow, whereas a lower b value indicates a color closer to blue.

A lower color difference (ΔE) between before/after evaluation as measured under weather exposure conditions of 2,500 kJ/m² in accordance with SAE J1960 indicates better weather resistance.

Next, the present invention will be described in more detail with reference to the following examples. However, it should be noted that these examples are provided for illustration only and should not be construed in any way as limiting the invention.

Examples and Comparative Examples

Details of components used in the following Examples and Comparative Examples are as follows:

(A) First Impact Modifier

A core-shell type graft copolymer obtained by emulsion graft polymerization of 40 wt % of a monomer mixture including 33 wt % of acrylonitrile and 67 wt % of styrene to 60 wt % of acrylic rubber polymer core including a butyl acrylate polymer and a butyl acrylate-styrene copolymer is used. The acrylic rubber polymer core has an average particle diameter (D50) of 320 nm and the first impact modifier has a refractive index of 1.511.

(B) Second Impact Modifier

A core-shell type graft copolymer obtained by emulsion graft polymerization of 40 wt % of methyl methacrylate to 60 wt % of a diene-acrylic rubber polymer core including polybutadiene and butyl acrylate polymers is used. The diene-acrylic rubber polymer core has an average particle diameter (D50) of 170 nm and the second impact modifier has a refractive index of 1.528.

(C) Alkyl (Meth)Acrylate Compound-Aromatic Vinyl Compound-Vinyl Cyanide Compound Copolymer A methyl methacrylate-styrene-acrylonitrile copolymer (MSAN) resin including 5 wt % of acrylonitrile, 20 wt % of styrene, and 75 wt % of methyl methacrylate and having a weight average molecular weight of 120,000 g/mol and a refractive index of 1.511 is used.

(D) Vinyl Cyanide Compound-Aromatic Vinyl Compound Copolymer

A styrene-acrylonitrile copolymer (SAN) resin including 24 wt % of acrylonitrile and 76 wt % of styrene and having a weight average molecular weight of 100,000 g/mol is used.

(E) Polycarbonate Resin

A linear bisphenol A type polycarbonate resin having a weight average molecular weight of 20,000 g/mol is used.

(F) Matting Agent

An ultra-high molecular weight styrene-acrylonitrile copolymer (SAN) resin including 24 wt % of acrylonitrile and 76 wt % of styrene and having a weight average molecular weight of 1,000,000 g/mol is used.

The above components are mixed in amounts as listed in Table 1, followed by extrusion and processing, thereby preparing a thermoplastic resin composition in pellet form. Extrusion is performed using a twin-screw extruder having L/D of 29 and a diameter of 45 mm at a barrel temperature of 260° C. The prepared pellets are dried at 80° C. for 2 hours, followed by injection molding using a 6 oz injection molding machine at a cylinder temperature of 250° C. and at a mold temperature of 60° C., thereby preparing a specimen for property evaluation and a specimen for weather resistance evaluation.

TABLE 1

| | | (A) | (B) | (C) | (D) | (E) | (F) |
|---|---|---|---|---|---|---|---|
| | | (Unit: parts by weight) | | | | | |
| Example | 1 | 16.25 | 8.75 | — | 31.25 | 68.75 | 1.00 |
| | 2 | 16.25 | 8.75 | — | 31.25 | 68.75 | 3.00 |
| | 3 | 16.25 | 8.75 | — | 31.25 | 68.75 | 5.00 |
| | 4 | 18.57 | 10.00 | 14.29 | 21.43 | 78.57 | 5.00 |
| | 5 | 16.25 | 8.75 | — | 12.45 | 87.55 | 5.00 |
| | 6 | 12.50 | 12.50 | — | 31.25 | 68.75 | 1.00 |
| | 7 | 18.75 | 6.25 | — | 31.25 | 68.75 | 3.00 |
| | 8 | 16.25 | 8.75 | — | 31.25 | 68.75 | 8.00 |
| Comparative Example | 1 | 16.25 | 8.75 | — | 31.25 | 68.75 | — |
| | 2 | 16.25 | 8.75 | — | 31.25 | 68.75 | 10.00 |
| | 3 | 25.00 | — | — | 31.25 | 68.75 | 3.00 |
| | 4 | — | 25.00 | — | 31.25 | 68.75 | 3.00 |
| | 5 | 23.64 | 12.72 | 45.45 | — | 100.00 | 3.00 |
| | 6 | 16.25 | 8.75 | — | 50.00 | 50.00 | 3.00 |
| | 7 | 20.00 | 5.00 | — | 31.25 | 68.75 | — |
| | 8 | 11.25 | 13.75 | — | 31.25 | 68.75 | 10.00 |
| | 9 | 16.25 | 8.75 | — | 31.25 | 68.75 | 9.00 |

Each of the thermoplastic resin compositions prepared according to Table 1 is evaluated as to the following properties. Results are shown in Table 2.

Evaluation of Properties (1) Impact resistance (unit: kgf·cm/cm): Izod impact strength is measured on a ⅛" thick notched Izod specimen in accordance with ASTM D256.

(2) Gloss (unit: %): Gloss of each of the specimens is measured at 60° in accordance with ASTM D523.

(3) Weather resistance: Color difference (ΔE) between before and after evaluation of each of the specimens is measured under weather exposure conditions of 2,500 kJ/m$^2$ in accordance with SAE J1960.

TABLE 2

| | | Item | | |
|---|---|---|---|---|
| | | Impact resistance (kgf · cm/cm) | Gloss (%) | Weather resistance |
| Example | 1 | 75 | 45 | 2.1 |
| | 2 | 65 | 35 | 2.5 |
| | 3 | 60 | 20 | 2.7 |
| | 4 | 58 | 32 | 2.0 |
| | 5 | 70 | 30 | 2.5 |
| | 6 | 80 | 45 | 2.5 |
| | 7 | 62 | 35 | 2.2 |
| | 8 | 55 | 15 | 2.9 |
| Comparative Example | 1 | 80 | 85 | 2.0 |
| | 2 | 42 | 15 | 4.5 |
| | 3 | 50 | 32 | 2.5 |
| | 4 | 55 | 39 | 3.6 |
| | 5 | 40 | 43 | 2.0 |
| | 6 | 35 | 40 | 2.1 |
| | 7 | 70 | 85 | 2.0 |
| | 8 | 40 | 10 | 3.0 |
| | 9 | 50 | 13 | 3.0 |

As shown in Table 2, it may be seen that the thermoplastic resin compositions of Examples 1 to 8 have an Izod impact resistance of 55 kgf·cm/cm or higher despite use of the matting agent and thus exhibit higher impact resistance than the thermoplastic resin compositions of the Comparative Examples excluding Comparative Examples 1 and 7 which did not suffer from deterioration in impact resistance even without the matting agent. In addition, the thermoplastic resin compositions of Examples 1 to 8 exhibit excellent low gloss properties, as compared with those of the Comparative Examples.

Further, the thermoplastic resin compositions of Examples 1 to 8 have a ΔE value of 2.0 to 2.9, whereas the thermoplastic resin compositions of the Comparative Examples have a high A E value of up to 4.5.

In other words, it may be seen that the thermoplastic resin compositions of Examples 1 to 8 exhibit excellent impact resistance, gloss, and weather resistance and are thus suitable for automotive interior components. Thus, critical significance of the amount ratio between the components of the thermoplastic resin composition according to the present invention and superiority of the thermoplastic resin composition according to the present invention is confirmed.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition for automotive interior components, comprising:
    a base resin comprising about 55 wt % to about 90 wt % of a polycarbonate resin and about 10 wt % to about 45 wt % of a vinyl cyanide compound-aromatic vinyl compound copolymer;
    about 5 parts by weight to about 30 parts by weight of an impact modifier based on about 100 parts by weight of the base resin; and
    about 1 part by weight to about 8 parts by weight of a matting agent based on about 100 parts by weight of the base resin,
    wherein the impact modifier comprises a first impact modifier which is a core-shell acrylic rubber-modified graft copolymer, and a second impact modifier which is a core-shell diene-acrylic rubber-modified graft copolymer,
    wherein a molded article for automotive interior components made using the thermoplastic resin composition has a color difference (ΔE) of about 2.0 to about 2.9, as measured under weather exposure conditions of 2,500 kJ/m² in accordance with SAE J1960.

2. The thermoplastic resin composition according to claim 1, further comprising an alkyl (meth)acrylate compound-aromatic vinyl compound-vinyl cyanide compound copolymer.

3. The thermoplastic resin composition according to claim 1, wherein the matting agent comprises an aromatic vinyl compound-vinyl cyanide compound copolymer having a weight average molecular weight of about 1,000,000 g/mol to about 10,000,000 g/mol.

4. The thermoplastic resin composition according to claim 3, wherein the aromatic vinyl compound-vinyl cyanide compound copolymer is a copolymer of a monomer mixture comprising about 65 wt % to about 85 wt % of an aromatic vinyl compound and about 15 wt % to about 35 wt % of a vinyl cyanide compound.

5. The thermoplastic resin composition according to claim 1, wherein the first impact modifier comprises: an acrylic rubber polymer core comprising a mixture of a polymer of an alkyl (meth)acrylate compound and a copolymer of an alkyl (meth)acrylate compound-aromatic vinyl compound; and a shell layer formed by grafting an aromatic vinyl compound-vinyl cyanide compound copolymer to the acrylic rubber polymer core.

6. The thermoplastic resin composition according to claim 5, wherein the first impact modifier comprises about 55 wt % to about 65 wt % of the acrylic rubber polymer core and about 35 wt % to about 45 wt % of the shell layer, and, in the shell layer, an amount ratio of the aromatic vinyl compound to the vinyl cyanide compound ranges from about 4:1 to about 1.5:1.

7. The thermoplastic resin composition according to claim 1, wherein the second impact modifier is a core-shell diene-acrylic rubber-modified graft copolymer and comprises: a diene-acrylic rubber polymer core comprising a diene rubber polymer and a polymer of alkyl (meth)acrylate; and a shell layer formed by grafting a polymer of alkyl (meth)acrylate to the diene-acrylic rubber polymer core.

8. The thermoplastic resin composition according to claim 7, wherein the second impact modifier comprises about 55 wt % to about 65 wt % of the diene-acrylic rubber polymer core and about 35 wt % to about 45 wt % of the shell layer.

9. The thermoplastic resin composition according to claim 1, wherein a weight ratio of the first impact modifier to the second impact modifier ranges from about 3:1 to about 1:1.

10. The thermoplastic resin composition according to claim 2, comprising the alkyl (meth)acrylate compound-aromatic vinyl compound-vinyl cyanide compound copolymer in an amount of about 10 parts by weight to about 20 parts by weight based on about 100 parts by weight of the base resin.

11. The thermoplastic resin composition according to claim 2, wherein the alkyl (meth)acrylate compound-aromatic vinyl compound-vinyl cyanide compound copolymer is a copolymer of a monomer mixture comprising about 2 wt % to about 10 wt % of a vinyl cyanide compound, about 15 wt % to about 25 wt % of an aromatic vinyl compound, and about 65 wt % to about 80 wt % of an alkyl (meth)acrylate compound.

12. A molded article for automotive interior components using the thermoplastic resin composition for automotive interior components according to claim 1.

13. The molded article according to claim 12, wherein the molded article has an Izod impact resistance (⅛", notched) of about 55 kgf·cm/cm to about 80 kgf·cm/cm, as measured at room temperature in accordance with ASTM D256 and has a gloss of about 15% to about 50%, as measured at 60° in accordance with ASTM D523.

* * * * *